Oct. 14, 1958    J. KAYE ET AL    2,856,160
TEMPERATURE CONTROL SYSTEM
Filed June 1, 1956

INVENTORS
JOSEPH KAYE
GEORGE N. HATSOPOULOS
BY
ATTORNEYS

United States Patent Office 2,856,160
Patented Oct. 14, 1958

2,856,160

TEMPERATURE CONTROL SYSTEM

Joseph Kaye, Brookline, and George N. Hatsopoulos, Boston, Mass., assignors, by mesne assignments, to Research Corporation, New York, N. Y., a corporation of New York Application June 1, 1956, Serial No. 588,907

5 Claims. (Cl. 257—2)

The present invention relates to thermal response systems and more particularly to control systems responsive to a thermal equilibrium mixture of liquid and vapor to maintain a surface in an essentially isothermal state.

Generally, various forms of temperature control devices attempting to maintain a given surface at a constant and uniform temperature are activated by means of a surface "average-temperature" error. That is, the activating temperature is one derived as an "average" from a plurality of temperature sensing elements, such as thermo-couples or a length of electrical resistance wire, disposed along the given surface. This temperature is then compared to a predetermined surface temperature, the difference or error there-between serving to initiate appropriate heating or cooling cycles.

Such systems cannot provide the requisite sensitivity needed to maintain an isothermal surface, because an error of temperature is necessary to activate the control mechanism. Even with the best available sensing elements, the measurable error is of the order of one-tenth of a degree Fahrenheit (0.1° F.).

The use of a thermostatic type of control system in connection with an isothermal surface presents still other shortcomings. As noted before, it is characteristic of such systems that a change or error in temperature must occur before a correction signal can be sensed. Hence, the response of the control system is largely one of temperature compensation which depends on the thermal lag or time delay of the entire system to correct the actuating error. In practical applications the effect of these thermal lags is generally an overshoot of the temperature response. For some systems these overshoots become so large that special auxiliary equipment engineered for the system becomes necessary.

In addition, the conventional type of feedback control is largely limited to a system dependent mainly on one variable, such as time, to achieve any degree of constancy of surface temperature. If the system depends on more than one variable, such as space as well as time, thermostatic temperature control becomes meaningless due to local heat flux variations unless one specifies each surface element to be maintained at a desired temperature. Since three-dimensional spatial temperature gradients and time gradients co-exist in many applications, and since the surface in question can be subjected to variable and non-uniform heat transfer rates, it is impractical to designate and control every surface element. Consequently, the thermostatic method of surface temperature control is inadequate for a multi-dimensional system.

It is a principal object of this invention to provide a control system to maintain an isothermal surface which is independent of mechanical temperature sensing elements, with the further important aspect of achieving control by means of a quantity which is different from the property to be controlled.

It is also an object to provide a control system that is activated without involving a temperature error so that thermal lags will not affect the temperature response.

It is a further object to provide an isothermal surface control system that is suitable for a multi-dimensional system, having time and space variables, as well as for a one-dimensional system.

In view of these and still other objects, this invention contemplates as a principal feature the use of an equilibrium mixture of liquid and vapor which is maintained so that a large interfacial area—the area between the liquid and the vapor—is essentially in direct contact with the desired control surface. A material, such as a wick, is employed as the medium by which the interfacial area is kept in contact with the desired surface.

The invention further involves the use of variations in vapor volume by which the control system is activated. The wick is contained in a chamber which is maintained at a constant pressure. The volume of the chamber can vary in accordance with changes of the vapor volume of the mixture brought about by the transfer of heat to the interfacial area. These volume variations actuate a control system consisting of a heating or cooling element so as to preserve the equilibrium mixture of liquid and vapor phases.

In the drawings illustrating the invention,

Figure 1:
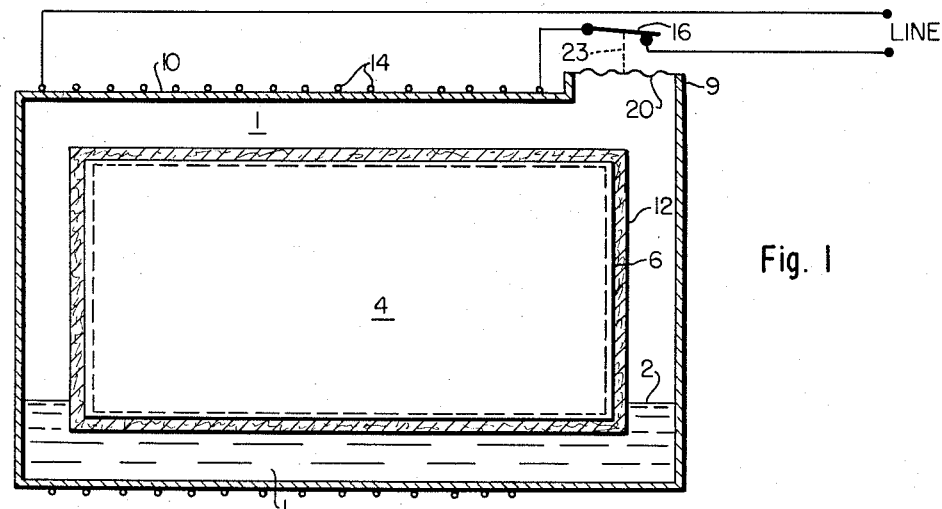
Fig. 1 is a schematic sectional representation of a system utilizing the invention.

The teachings of the invention may best be explained by reference to Fig. 1, which discloses the basic elements constituting the control system to maintain an isothermal surface in an ideal case. The inner chamber or housing shown as a unit 4 is located concentrically with respect to the outer chamber of housing designated 10. The inner chamber 4 has its outer surface 6 completely encased and shielded by a liquid absorbing material or wick 12. The wick 12 is in turn immersed in a pure liquid phase bath 2 of a single component two-phase mixture contained in the evacuated annular gap 1 formed between the inner chamber 4 and the outer chamber 10. Within the annular gap the pressure is ideally maintained constant on the liquid-vapor mixture so that the temperature at the vapor-liquid interface within the wick 12 will also remain constant. It is a well known thermodynamic fact that such a thermal equilibrium of vapor-liquid mixture at saturation will give a constant temperature for any given pressure. As long as a suitable liquid in the correct amount is selected which has a sufficiently high latent heat of evaporation so that variations in heat flux can be accommodated without reducing the level of the liquid so as to no longer saturate the wick, this relationship will hold true.

A hermetically sealed volume-responsive means is provided in the outer housing 10 in the nature of a casing or barrel 9 to accommodate volume changes of the mixture and a mechanical arrangement responsive thereto. A preferred embodiment is illustrated in Fig. 1 consisting of a diaphragm 20 disposed across the top of casing 9 which actuates the follower rod 23 which is connected at its other end to the switch 16. The diaphragm 20 being sufficiently soft, causes no significant increase of pressure under volume changes as occur in operation. Forming part of the electrical circuit are the heater elements 14 disposed along the surface of the chamber and controlled by the electrical switch 16.

The operation of the control system is basically dependent on a thermal equilibrium mixture of liquid and vapor maintained at a constant pressure. Assuming the generation of heat flux from heat sources within the inner chamber 4 that vary in time and space, local heat transfer rates will traverse the wall of the inner chamber 4. The heat flows which thus traverse the wall of the chamber 4 will pass into the wick 12 immediately thereto where a large interfacial area exists between the liquid and vapor. Since this interfacial area is at constant temperature as long as the pressure is constant, evaporation of the liquid in the wick occurs at constant temperature. The vapor formed will then diffuse through the wick 12 into the annular gap 1.

Once the vapor volume within the annular gap increases, the diaphragm 20 moves upwardly at constant pressure. If the external heater elements 14 are on, as for the case of operation of the isothermal surface at temperatures greater than the ambient temperature, then no condensation of the vapor will occur when it encounters the wall of the outer chamber 10. The motion of the diaphragm will thus continue until it opens the switch 16 to shut off the heater current. With the heater current off, the temperature of the wall of the outer chamber 10 will begin to fall so as to cause condensation of the vapor on the inside surface of the said chamber.

Once the process of condensation occurs the droplets of liquid formed are returned to the bottom of the annular space at the same temperature as that of the wick 12 since the pressure is assumed constant. These droplets are returned to the wick in liquid form by capillary attraction.

The condensation of vapor at the outer housing 10 tends to keep it from dropping in temperature and simultaneously reduces the vapor volume causing the diaphragm 20 to move down. Ultimately the volume of the vapor is reduced to the point where the travel of the diaphragm is sufficient to permit closing of the electrical switch turning the current on to the heater, and the cycle is repeated.

Figure 2:
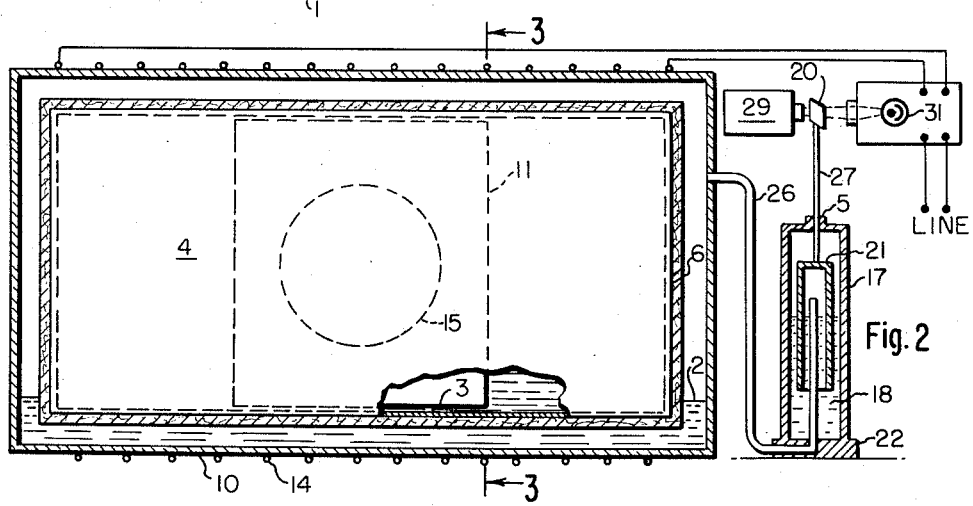
Fig. 2 is a side elevation view of a liquid damped gyroscopic unit embodying the invention.
Figure 3:
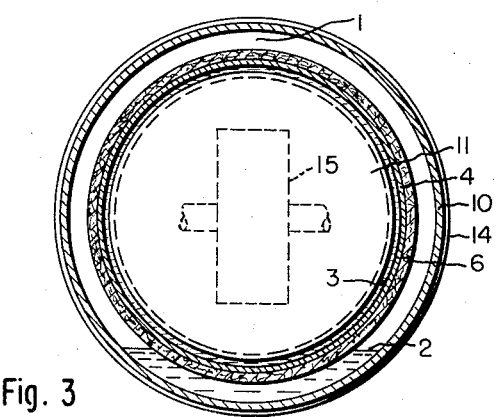
Fig. 3 is a sectional view of the gyroscopic unit taken along line 3—3 of Fig. 2.

The apparatus shown in Figs. 2 and 3 contains the essential elements of the device of Fig. 1, with the further provision that a liquid damped gyroscopic assembly and an integrated pressure-volume sensing means are included. Throughout the following description like numbers indicate like members of the device of Fig. 1.

Gyroscopic devices such as accelerometers, integrators and other instruments used for precise dynamic measurements may be of such construction as to require a temperature control system. The apparatus of Fig. 2 is such a device. The gyroscope of Fig. 2 includes the outer cylindrical chamber 10 and a concentric inner cylindrical chamber 4, having in addition an innermost cylindrical chamber or "float can" 11 which houses the gyro assembly indicated in dotted outline at 15. The "float can" 11 is free to rotate about its axis with respect to the inner chamber 4 and maintains a uniform thin annular space there-between. A viscous fluid 3 is contained in the aforesaid annular space in which the innermost chamber 11 floats. For purposes not related to this invention, it is essential for proper performance of the gyroscope apparatus that the viscosity of the fluid 3 be held constant. Since the viscosity of the fluid is primarily a function of temperature, maintaining the inner surface of chamber 4 at a constant temperature will maintain the viscosity of the thin layer of the fluid 3 constant.

For practical reasons, the isothermal surface must be placed at the outer surface 6 of inner chamber 4. Hence, enclosing and shielding the surface 6 of inner chamber 4 is the wick 12 which is immersed in liquid 2 in a manner heretofore described. It is to be noted that while it is true that a temperature gradient will exist between the inner and the outer surface of chamber 4, it may be readily calculated, but in practice the effect of a temperature gradient is negligible.

Within the annular gap 1 formed by the outer chamber 10 and the inner chamber 4 the pressure is maintained essentially constant by means of a conventional inverted gas tank type of pressure container device 22. The unit 22 consists of a cylindrically shaped floating bell 21 which is concentrically located with respect to the outer casing or housing 17. The floating bell is buoyed up by a liquid 18 contained within itself and the casing 17. To avoid contamination, the liquid 18 is preferably the same as the liquid 2 of the gyro unit.

A tube 26 which has one end within the floating bell above the level of the liquid, connects the bell to the annular gap 1 that contains the vapor liquid mixture. Since the upper end or top of the floating bell is closed, the volume above the liquid is effectively sealed. The pressure of this volume is, of course, the same as the pressure of the annular gap 1. A rod 27 that is secured to the top of the floating bell passes through a sealed guide sleeve or journal 5 in the outer housing 17 and is provided at its opposite end with a shield or interrupter 20. The shield 20 is used to turn on and off the current to the heater coil elements 14 by means of the photoelectric cell 31 and light source 29.

The operative nature of this embodiment is similar to the one described before. Variations in internal heat occur as a result of operation of the gyroscope 15, and the entire assembly is also subjected to changes in external conditions that further influence the heat fluxes locally. Nonetheless, the local rates of heat flow do no more than affect the rates of evaporation at each locale, the total evaporation contributing to increase of vapor volume within the annular gap 1. As before, the evaporation of the liquid in the wick will occur at constant temperature since the pressure is maintained substantially constant by the pressure container 22.

As the vapor volume increases it passes through the tube 26 to the volume above the liquid of the floating bell 21. The increase in vapor volume is accompanied by an increase in pressure in the bell 21 that is compensated for by an increase of volume or raising of the floating bell since the restraining force on the bell is constant. The upward motion of the bell will thus continue until the shield 20 interrupts the passage of light to the photoelectric cell 31 which turns off the heater current to the heating elements 14. The effect of turning the heater 14 off and subsequent occurrences proceed as heretofore described.

While the invention has been described for purposes of simplicity in terms of a single component two phase mixture, it is clear that in some applications the use of more than a single component may be advisable.

In addition, the invention may also be utilized to keep an isothermal surface at a temperature less than the ambient temperature. All that is required in this case is the substitution of cooling elements for heating elements. It may be assumed initially that the cooling coil is off so that heat generated by elements within the isothermal surface passes to the wick-liquid-vapor chamber. The vapor volume then increases, activating the cooling system, which causes condensation of the vapor. When the rate of condensation exceeds the evaporation, the volume of the vapor will fall until such time as the cooling system is turned off. Hence, the operation of the system is essentially the same as the one described in detail.

It is, of course, evident that many liquids are available to serve as the evaporative medium to accommodate the rates of heat transfer for different applications. Such liquids may be, for purposes of illustration, water or alcohol. In the embodiment shown, the gyroscopic device, Freon 113 gives satisfactory results since its rate of evaporation is sufficient to accommodate the rates of heat transfer to the Freon. It has also been determined that for the gyroscope unit a stable weave fiber glass has the property to insure a proper rate of return of the liquid to the wick by capillary attraction. Other materials that may serve as a liquid absorbing wick are, for example, cotton, blotting paper, or a linen substitute.

From the foregoing it is evident that this invention provides a liquid-vapor control system operating on principles of thermal equilibrium at constant pressure. Variations in volume of vapor at constant pressure are utilized to operate what may be termed thermal supply means (either heating or cooling), by which the surface to be controlled is maintained very closely in an isothermal condition.

Having thus described the invention, we claim:

1. A temperature control system to maintain an isothermal surface comprising a housing within which said surface is enclosed, a body of liquid-absorbing material for maintaining adjacent to the surface a body of liquid in thermal equilibrium with its vapor, means for varying the volume of the space in said housing without substantial change of pressure, thermal supply means for the exterior of the housing, and means controlled by variations of volume in said space to operate the thermal supply means.

2. A temperature control system to maintain an isothermal surface comprising a wick associated with said surface, a housing forming an enclosed variable-volume space for the surface and the wick, a liquid supply for the wick, the liquid being in thermal equilibrium with its vapor in said space, means for effecting variations of volume in said space without substantial changes in pressure, thermal supply means for the exterior of the housing, and means controlled by variations of volume in said space to operate the thermal supply means.

3. A temperature control system to maintain an isothermal surface comprising an inner chamber, the outer surface of which is to be maintained at constant temperature, a wick surrounding the chamber, a housing within which the chamber and the wick are enclosed, means for effecting changes in volume of the space within said housing without substantial changes in pressure, a liquid supply for the wick, thermal supply means for the housing, and means for operating the thermal supply means in accordance with variations in volume.

4. A temperature control system to maintain an isothermal surface comprising an inner chamber, the outer surface of which is to be maintained at constant temperature, a wick surrounding the chamber, a housing within which the chamber and the wick are enclosed, a diaphragm responsive to changes of volume in the housing without substantial changes in pressure, a liquid supply for the wick, thermal supply means for the housing, and means operated by the diaphragm for controlling the thermal supply means.

5. A temperature control system to maintain an isothermal surface comprising an inner chamber, the outer surface of which is to be maintained at constant temperature, a body of liquid-absorbing material completely surrounding and enclosing the chamber, a housing within which the chamber is enclosed, means for effecting changes in volume of the space within said housing without substantial changes in pressure, a liquid supply maintained in the absorbing material, thermal supply means for the housing, and means for operating the thermal supply means in accordance with variations in volume.

References Cited in the file of this patent

UNITED STATES PATENTS

| | | |
|---|---|---|
| 2,711,882 | Narbutovskih | June 28, 1955 |
| 2,762,895 | Throw | Sept. 11, 1956 |